(12) United States Patent
Mitsuishi et al.

(10) Patent No.: US 6,693,747 B2
(45) Date of Patent: Feb. 17, 2004

(54) OPTICAL ELEMENT HAVING ANTIREFLECTION FILM

(75) Inventors: Takeshi Mitsuishi, Tokyo (JP); Kenichi Shinde, Tokyo (JP)

(73) Assignee: Hoya Corporation, Tokyo (JP)

( * ) Notice: Subject to any disclaimer, the term of this patent is extended or adjusted under 35 U.S.C. 154(b) by 33 days.

(21) Appl. No.: 10/370,091

(22) Filed: Feb. 21, 2003

(65) Prior Publication Data

US 2003/0193719 A1 Oct. 16, 2003

Related U.S. Application Data

(63) Continuation of application No. 09/939,668, filed on Aug. 28, 2001, now abandoned.

(30) Foreign Application Priority Data

Aug. 29, 2000 (JP) .......................................... 2000-258628

(51) Int. Cl.$^7$ ............................... G02B 1/10; G02B 1/11
(52) U.S. Cl. ........................ 359/585; 359/580; 359/586
(58) Field of Search ................................. 359/580, 581, 359/582, 585, 586, 588

(56) References Cited

U.S. PATENT DOCUMENTS

| | | | |
|---|---|---|---|
| 5,268,781 A | 12/1993 | Shigeta et al. | |
| 5,667,880 A | 9/1997 | Okaniwa | 359/359 |
| 5,691,044 A | 11/1997 | Oyama et al. | 313/461 |
| 5,693,366 A | 12/1997 | Mase et al. | 427/164 |
| 5,783,049 A | 7/1998 | Bright et al. | 204/192.14 |
| 5,942,338 A | 8/1999 | Arbab et al. | 428/623 |
| 5,948,538 A * | 9/1999 | Brochot et al. | 428/432 |
| 5,963,373 A | 10/1999 | Kayanoki | 351/166 |
| 6,353,501 B1 | 3/2002 | Woodruff et al. | 359/360 |
| 6,358,617 B1 | 3/2002 | Ohsaki et al. | 359/359 |

FOREIGN PATENT DOCUMENTS

| | | |
|---|---|---|
| EP | 0 578 220 A2 | 1/1994 |
| JP | 186202 | 8/1987 |

OTHER PUBLICATIONS

M. Fliedner et al., Society of Vacuum Coaters, Albuquerque, NM, pp. 237–241 (1995).
Copending Application No. 09/939,664.

\* cited by examiner

*Primary Examiner*—John Juba
(74) *Attorney, Agent, or Firm*—Finnegan, Henderson, Farabow, Garrett & Dunner, LLP

(57) ABSTRACT

An optical element having a plastic substrate and an antireflection film provided on the plastic substrate, characterized in that the optical element has a basic layer comprising Nb between the plastic substrate and the antireflection film. The optical element has high adhesiveness between the plastic substrate and the antireflection film and is characterized by excellent resistance to heat, impact, alkali, and abrasion.

12 Claims, No Drawings

OPTICAL ELEMENT HAVING ANTIREFLECTION FILM

This is a continuation of application Ser. No. 09/939,668, filed Aug. 28, 2001, abandoned, which is incorporated herein by reference.

The present invention relates to an optical element having an antireflection film. It relates to an optical element having an antireflection film that has excellent adhesiveness between a plastic substrate and the antireflection film, abrasion resistance, heat resistance, alkali resistance and impact resistance.

Heretofore known are optical elements having an antireflection film provided on a plastic substrate. Also known are optical elements having a thin metal film layer provided on the surface of a plastic substrate for enhancing the adhesiveness between the plastic substrate and the antireflection film. For example, Japanese Patent Laid-Open No.186202/1987 discloses an antireflection film for an optical element having a thin metal film layer provided on the surface of a plastic substrate, in which the metal layer is made of a metal selected from the group consisting of copper (Cu), aluminum (Al), nickel (Ni), gold (Au), chromium (Cr), palladium (Pd) and tin (Sn).

However, these optical elements having an antireflection film are unsatisfactory with respect to their heat resistance and impact resistance. Therefore, it is desirable to provide optical elements having an antireflection film that have improved physical properties such as heat resistance, abrasion resistance, alkali resistance and impact resistance.

Heretofore, in general, a basic layer made of $SiO_2$ has been provided in a plastic lens for enhancing the strength of coating films. However, the basic layer made of $SiO_2$ has a drawback of lowering the heat resistance of the plastic lens.

The present invention provides an optical element having an antireflection film having excellent adhesiveness between a plastic substrate and the antireflection film, heat resistance, abrasion resistance, alkali resistance and impact resistance.

The present invention addresses the problems noted above. The inventors have determined that when a layer made of niobium (Nb) is provided between a plastic substrate and an antireflection film to form an optical element, the adhesiveness between the plastic substrate and the antireflection film, the heat resistance, abrasive resistance, alkali resistance and the impact resistance of the optical element are improved.

The optical element of the invention has a basic layer made of Nb, and therefore, has not only excellent adhesiveness between the plastic substrate and the antireflection film, heat resistance and impact resistance, but also excellent alkali and abrasion resistance and properties such that an absorbance index inherent to metals is low.

The basic layer may consist of Nb (that is 100% by weight of Nb), or may comprise a mixture of niobium and up to 50% by weight, preferably 25% by weight of other elements such as aluminum(Al), chromium(Cr), tantalum (Ta) and mixtures of two or more thereof. The antireflection film may also be comprised of multi-layers, and at least one of the layers is obtainable by an ion-assisted process. The basic layer comprising Nb may also be formed by an ion-assisted process.

The "ion-assisted process" referred to herein is a well known process also called "ion beam assisted vapor deposition process". According to this process, a material is deposited on a substrate, such as a lens substrate, by vapor deposition using an ion plasma in a gas atmosphere, such as argon (Ar) and/or oxygen. In a common apparatus suitable to perform this process, preferred vapor deposition conditions are an accelerating voltage of 100–250V, and an accelerating current of 50–150 mA. A detailed description is given in e.g. U.S. Pat. No. 5,268,781. Further details can be derived from M. Fliedner et al., Society of Vacuum Coaters, Albuquerque, N.M., USA. p237–241, 1995 as well as from the references cited therein.

In the ion-assisted process, argon (Ar) maybe used as the ionizing gas for preventing oxidation of films being formed. Although argon is preferred, other ionizing gases such as oxygen and nitrogen, or mixtures of these gases could also be used. This stabilizes the quality of the films formed and enables easy control of the thickness of the films by the use of an optical film thickness meter.

For ensuring good adhesiveness between the plastic substrate and the basic layer and for ensuring good uniformity of the initial film morphology in vapor deposition in the ion-assisted process, the plastic substrate may be subjected to ion gun pretreatment before the basic layer is formed thereon. The ionizing gas in the ion gun pretreatment may be any of oxygen, nitrogen, Ar, or mixtures thereof. For the preferred power range, the accelerating voltage is from 50 V to 200 V, and the accelerating current is from 50 mA to 150 mA. If the accelerating voltage is lower than 50 V, or the accelerating current is lower than 50 mA, an effect for improving the adhesiveness between the plastic substrate and the basic layer formed thereon may not be sufficient. However, if the accelerating voltage exceeds 200 V, or the accelerating current exceeds 150 mA, the plastic substrate and also the cured film and the hard coat layer thereon may possibly be yellowed, or the abrasion resistance of the optical element may possibly be lowered.

In the invention, after the basic layer comprising Nb has been formed on the substrate, an antireflection layer is formed by any suitable process. For example, it may be formed by vapor deposition, such as chemical vapor deposition (CVD) or physical vapor deposition (PVD), or by other methods such as ion plating vapor deposition.

In one embodiment, the antireflection film has at least one $SiO_2$ layer as a low-refraction layer and at least one $TiO_2$ layer as a high-refraction layer. If desired, the antireflection film may have a metal layer comprising Nb.

For relieving the stress within the low-refraction layer such as an $SiO_2$ layer, when the $SiO_2$ layer is formed in an ion-assisted process in which Ar is used for the ionizing gas for $SiO_2$ deposition, the abrasion resistance can be improved. Regarding the ion-assisting condition for obtaining the result, the ion current density on the dome in the vapor deposition device is from 15 to 35 $\mu A$, and the accelerating voltage is from 400 to 700 V. If the ion current density is lower than 15 $\mu A$ or the accelerating voltage is lower than 400 V, both an effect for relieving the stress and an effect for improving the abrasion resistance may be hardly obtained. If, however, the ion current density exceeds 35 $\mu A$ or the accelerating voltage exceeds 700 V, the plastic substrate may possibly be yellowed, or the optical performance may possibly be adversely affected.

The high-refraction layer such as a $TiO_2$ layer may also be formed in an ion-assisted process. For the ionizing gas in the ion-assisted process for forming the high-refraction layer, a mixed gas of $O_2$ and Ar is used. The mixing ratio of $O_2$ to Ar based on the volume of flowing gases preferably ranges from 1:0.5–2. It is possible to improve the refractive index of the high-refraction layer formed and to promote the improvement of the abrasion resistance by using an ion-assisted process. Materials for forming the high-refraction layer are $TiO_2$, $Nb_2O_5$, $Ta_2O_5$, $ZrO_2$, $Y_2O_3$, and mixtures thereof. Preferred examples include $TiO_2$, $Nb_2O_5$, $Ta_2O_5$ and mixtures thereof.

As a suitable ion-assisting condition for using $TiO_2$, $Nb_2O_5$ or their mixtures as the metal oxide, the ion current density on the dome in the vapor deposition device is from 8 to 15 $\mu A$, and the accelerating voltage is from 300 to 700 V. The volume ratio of $O_2$ to Ar in the ionizing gas mixture is from 1/0.7 to 1/1.0. If the ion current density, the accelerating voltage and the ionizing gas ratio overstep the defined ranges, the intended refractive index may not be obtained, and, in addition, its absorbance index may likely increase, and its abrasion resistance may possibly be lowered.

As a suitable ion-assisting condition for using $Ta_2O_5$ or its mixtures as the metal oxide, the ion current density on the dome in the vapor deposition device is from 12 to 20 $\mu A$, and the accelerating voltage is from 400 to 700 V. The volume ratio of $O_2$ to Ar in the ionizing gas mixture is from 1/0.5 to 1/2.0. If the ion current density, the accelerating voltage and the ionizing gas ratio overstep the defined ranges, the intended refractive index may not be obtained, and, in addition, its absorbance index may likely increase, and its abrasion resistance may possibly be lowered.

A suitable thickness of the basic layer of the optical element of the invention is from 1.0 to 5.0 nm. If its thickness oversteps the defined range, the basic layer may possibly present a problem of absorbance within the film.

One embodiment of the layer constitution of the basic layer and the antireflection film formed on the plastic substrate is described below. Herein, the laminate of the 1st to 7th layers serves as the antireflection film.

Basic layer: Nb layer (film thickness: 1 to 5 nm)
1st layer: $SiO_2$ layer (film thickness: 5 to 50 nm)
2nd layer: $TiO_2$ layer (film thickness: 1 to 15 nm)
3rd layer: $SiO_2$ layer (film thickness: 20 to 360 nm)
4th layer: $TiO_2$ layer (film thickness: 5 to 55 nm)
5th layer: $SiO_2$ layer (film thickness: 5 to 50 nm)
6th layer: $TiO_2$ layer (film thickness: 5 to 130 nm)
7th layer: $SiO_2$ layer (film thickness: 70 to 100 nm)

The ranges of the film thickness mentioned above are the most preferred ones for the adhesiveness between the plastic substrate and the antireflection film and for the heat resistance and impact resistance of the optical element.

Another embodiment of the layer constitution of the basic layer and the antireflection film is mentioned below. Herein, the laminate of the 1st to 7th layers serves as the antireflection film.

Basic layer: Nb layer (film thickness: 1 to 5 nm)
1st layer: $SiO_2$ layer (film thickness: 20 to 100 nm)
2nd layer: Nb layer (film thickness: 1 to 5 nm)
3rd layer: $SiO_2$ layer (film thickness: 20 to 100 nm)
4th layer: $TiO_2$ layer (film thickness: 5 to 55 nm)
5th layer: $SiO_2$ layer (film thickness: 5 to 50 nm)
6th layer: $TiO_2$ layer (film thickness: 5 to 130 nm)
7th layer: $SiO_2$ layer (film thickness: 70 to 100 nm)

The ranges of the film thickness mentioned above are the most preferred ones for the adhesiveness between the plastic substrate and the antireflection film and for the heat resistance and impact resistance of the optical element.

The material for the plastic substrate for use in the invention is not specifically limited. Suitable materials include, for example, methyl methacrylate homopolymers, copolymers of methyl methacrylate and one or more other monomers such as diethylene glycol bisallyl carbonate or benzyl methacrylate, diethylene glycol bisallyl carbonate homopolymers, copolymers of diethylene glycol bisallyl carbonate and one or more other monomers such as methyl methacrylate and benzyl methacrylate, sulfur-containing copolymers, halogen copolymers, polycarbonates, polystyrenes, polyvinyl chlorides, unsaturated polyesters, polyethylene terephthalates, polyurethanes, and polythiourethanes. Preferred examples include polythiourethane, diethylene glycol bisallyl carbonate homopolymers, and sulfur-containing copolymers.

If desired, the optical element of the invention may have a cured film between the plastic substrate and the basic layer.

For the cured film, in general, a coating composition is used that comprises metal oxide colloid particles and one or more organosilicon compounds represented by the following general formula (1):

$$(R^1)_a(R^2)_b Si(OR^3)_{4-(a+b)} \qquad (1)$$

wherein $R^1$ and $R^2$ each independently represents an organic group selected from an $C_{1-8}$ alkyl group, an $C_{2-8}$ alkenyl group, an aryl group, a phenyl group, a 5- or 6-membered heteroaryl group having at least one heteroatom selected from sulfur and nitrogen which may optionally be substituted by one or more $C_{1-3}$ alkyl group(s), an $C_{1-8}$ acyl group, a halogen atom, a glycidoxy group, an epoxy group, an amino group, a phenyl group, a mercapto group, a methacryloxy group, and a cyano group; $R^3$ represents an organic group selected from an alkyl group having from 1 to 8 carbon atoms, an $C_{1-8}$ acyl group, and a phenyl group; and a and b each independently indicates an integer of 0 or 1. For applying the coating composition onto the surface of a plastic lens substrate, any ordinary method of dip coating, spin coating, or spraying may be employed. In view of the smoothness of the coated film, especially preferred is dip coating or spin coating. Having been applied to lens substrates, the composition is cured by drying it in hot air or by exposing it to active energy rays. Preferably, it is cured in hot air at 70 to $_{200}°$ C., and more preferably at 90 to 150° C. For the active energy rays, preferred are far-infrared rays as not damaging the film by heat.

The metal oxide colloid particles generally are fine metal oxide particles having a particle size of 1–500 nm. Preferred examples thereof are colloid particles of tungsten oxide ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), berylliumoxide (BeO) or antimonyoxide ($Sb_2O_5$) These metal oxides may be used either singly or in admixture of two or more thereof.

The organosilicon compound of the general formula (1) includes, for example, methyl silicate, ethyl silicate, n-propyl silicate, isopropyl silicate, n-butyl silicate, sec-butyl silicate, tert-butyl silicate, tetraacetoxysilane, methyltrimethoxysilane, methyltriethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane,
glycidoxymethyltriethoxysilane,
α-glycidoxyethyltriethoxysilane,
β-glycidoxyethyltrimethoxysilane,
β-glycidoxyethyltriethoxysilane,
α-glycidoxypropyltrimethoxysilane,
α-glycidoxypropyltriethoxysilane,
β-glycidoxypropyltrimethoxysilane,
β-glycidoxypropyltriethoxysilane,
γ-glycidoxypropyltrimethoxysilane,
γ-glycidoxypropyltriethoxysilane,
γ-glycidoxypropyltripropoxysilane,
γ-glycidoxypropyltributoxysilane, γ-glycidoxypropyltriphenoxysilane,
α-glycidoxybutyltrimethoxysilane,
α-glycidoxybutyltriethoxysilane,
β-glycidoxybutyltrimethoxysilane,
β-glycidoxybutyltriethoxysilane,
γ-glycidoxybutyltrimethoxysialne,
γ-glycidoxybutyltriethoxysilane,
δ-glycidoxybutyltrimethoxysilane,
δ-glycidoxybutyltriethoxysilane, (3,4-epoxycyclohexyl) methyltrimethoxysilane, (3,4-epoxycyclohexyl) methyltriethoxysilane, β-(3,4-epoxycyclohexyl) ethyltrimethoxysilane, β-(3,4-epoxycyclohexyl) ethyltriethoxysilane, β-(3,4-epoxycyclohexyl) ethyltripropoxysilane, β-(3,4-epoxycyclohexyl) ethyltributoxysilane, β-(3,4-epoxycyclohexyl) ethyltriphenoxysilane, γ-(3,4-epoxycyclohexyl) propyltrimethoxysilane, γ-(3,4-epoxycyclohexyl) propyltriethoxysilane, δ-(3,4-epoxycyclohexyl) butyltrimethoxysilane, δ-(3,4-epoxycyclohexyl) butyltriethoxysilane,
glycidoxymethylmethyldimethoxysilane,
glycidoxymethylmethyldiethoxysilane,
α-glycidoxyethylmethyldimethoxysilane,
α-glycidoxyethylmethyldiethoxysilane,
β-glycidoxyethylmethyldimethoxysilane,
β-glycidoxyethylmethyldiethoxysilane,
α-glycidoxypropylmethyldimethoxysilane,
α-glycidoxypropylmethyldiethoxysilane,
β-glycidoxypropylmethyldimethoxysilane,
β-glycidoxypropylmethyldiethoxysilane,
γ-glycidoxypropylmethyldimethoxysilane,
γ-glycidoxypropylmethyldiethoxysilane,
γ-glycidoxypropylmethyldipropoxysilane,
γ-glycidoxypropylmethyldibutoxysilane,
γ-glycidoxypropylmethyldiphenoxysilane,
γ-glycidoxypropylethyldimethoxysilane,
γ-glycidoxypropylethyldiethoxysilane,
γ-glycidoxypropylvinyldimethoxysilane,
γ-glycidoxypropylvinyldiethoxysilane,
γ-glycidoxypropylphenyldimethoxysilane,
γ-glycidoxypropylphenyldiethoxysilane,
ethyltrimethoxysilane, ethyltriethoxysilane, vinyltrimethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane,
γ-chloropropyltriethoxysilane,
γ-chloropropyltriacetoxysilane, 3,3,3-trifluoropropyltrimethoxysilane,
γ-methacryloxypropyltrimethoxysilane,
γ-mercaptopropyltrimethoxysilane,
γ-mercaptopropyltriethoxysilane,
β-cyanoethyltriethoxysilane, chloromethyltrimethoxysilane, chloromethyltriethoxysilane, N-(β-aminoethyl)-γ-aminopropyltrimethoxysilane, N-(β-aminoethyl)-γ-aminopropylmethyldimethoxysilane,
γ-aminopropylmethyldimethoxysilane, N-(β-aminoethyl)-γ-aminopropyltriethoxysilane, N-(β-aminoethyl)-γ-aminopropylmethyldiethoxysilane,
dimethyldimethoxysilane, phenylmethyldimethoxysilane, dimethyldiethoxysilane, phenylmethyldiethoxysilane,
γ-chloropropylmethyldimethoxysilane,
γ-chloropropylmethyldimethoxysilane,
dimethyldiacetoxysilane,
γ-methacryloxypropylmethyldimethoxysilane,
γ-methacryloxypropylmethyldiethoxysilane,
γ-mercaptopropylmethyldimethoxysilane,
γ-mercaptopropylmethyldiethoxysilane,
methylvinyldimethoxysilane, and methylvinyldiethoxysilane.

EXAMPLES

The invention is described in more detail with reference to the following Examples, which, however, are not intended to restrict the scope of the invention.

The physical properties of the optical elements obtained in the following Examples and Comparative Examples were evaluated according to the methods mentioned below.

(1) Luminous Transmittance:

Using a spectrophotometer, U-3410 made by Hitachi, Ltd., the luminous transmittance, Y of a plastic lens as a sample, having an antireflection film on both surfaces, was measured.

(2) Luminous Reflectance:

Using a spectrophotometer, U-3410 made by Hitachi, Ltd., the luminous reflectance, Y of a plastic lens as a sample, having an antireflection film on both surfaces, was measured.

(3) Film Adhesiveness:

Using a cutting tool, the surface of a plastic lens was cut to have 100 cross-cuts of 1 mm×1 mm each. An adhesive tape, Cellotape was stuck on its cross-cut area, and peeled off at a stroke. The number of remained cross-cuts was counted and shown in the following Tables, in which (number of cross-cuts remained)/100 indicates the film adhesiveness.

(4) Abrasion Resistance:

The surface of a plastic lens was rubbed with steel wool under a load of 1 kgf/cm$^2$ applied thereto. After 20 strokes of rubbing, the surface condition of the plastic lens was evaluated according to the following criteria:

UA: Scratched little.

A: few thin scratch marks found.

B: Many thin scratch marks and a few thick scratch marks found.

C: Many thin and thick scratch marks found.

D: Almost completely peeled.

(5) Heat Resistance:

A plastic lens was put into an oven preheated to a selected temperature, and was left there for 1 hour. This experiment was performed at different temperatures, starting from 60° C. with increments of 5°. The temperature was measured, at which the lens could not withstand the heat treatment and was cracked after 1 hour. This temperature is given as heat resistance in the Tables below.

(6) Alkali Resistance:

A plastic lens was dipped in an aqueous 10% NaOH solution for 1 hour, and its surface condition was evaluated according to the following criteria:

UA: Changed little.

A: A few peeled dots found.

B: Many peeled dots found everywhere on the surface.

C: Many peeled dots found everywhere on the surface, and a few peeled squares found.

D: Almost completely peeled.

(7) Impact Resistance:

A plastic lens having a center thickness of 2.0 mm and a power of lens of 0.00 was prepared and subjected to a drop ball test as defined by the Food and Drug Administration. "O" indicates a good sample; and "x" indicates a rejected sample.

Examples 1 to 12

90 parts by weight of colloidal silica (Snowtex-40, available from Nissan Chemical Industries, ltd.), 81.6 parts by weight of methyltrimethoxysilane and 176 parts by weight of γ-glycidoxypropyltrimethoxysilane as organosilicon compounds, 2.0 parts by weight of 0.5 N hydrochloric acid, 20 parts by weight of acetic acid, and 90 parts by weight of water were charged into a glass container, and the solution was stirred at room temperature for 8 hours. Then, the resulting solution was left at room temperature for 16 hours to obtain a hydrolyzed solution. To this solution were added 120 parts by weight of isopropyl alcohol, 120 parts by weight of n-butyl alcohol, 16 parts by weight of aluminum acetylacetone, 0.2 parts by weight of a silicone surfactant, and 0.1 part by weight of a UV absorbent. The mixture was stirred at room temperature for 8 hours, and then aged at room temperature for 24 hours to obtain a coating solution.

A plastic lens substrate (made from diethylene glycol bisallyl carbonate, and having a refractive index of 1.50, a center thickness of 2.0 mm and a power of lens of 0.00), which had been pretreated with an aqueous alkaline solution, was dipped in the coating solution. After completion of dipping, the plastic lens was taken out at a pulling rate of 20 cm/min. Then, the plastic lens was heated at 120° C. for 2 hours to form a cured film. Next, the resulting plastic lens was subjected to an ion gun treatment according to an ion-assisted process using an Ar gas under the condition of the ion acceleration voltage and exposure time as shown in Tables 1 to 6, thereby making it have a cured hard coat layer (hereinafter referred to as layer A).

Next, a basic layer and a functional film composed of the 1st to 7th layers shown in Tables 1 to 6 were formed on the hard coat layer A, according to an ion-assisted process under the condition shown in Tables 1 to 6, thereby obtaining plastic lenses.

The plastic lenses were evaluated according to the methods (1) to (7) mentioned above, and the results are shown in Tables 1 to 6. In the Tables, the wavelength of measurement for measuring optical thickness of the film is 500 nm.

Comparative Examples 1 to 4

Plastic lenses were obtained in the same manner as in Examples 1 to 12, except that the basic layer was not formed and that the hard coat layer and the functional film composed of the 1st to 7th layers were formed not in the ion-assisted process but in the vapor deposition.

The plastic lenses were evaluated according to the methods (1) to (7) mentioned above, and the results are shown in Tables 7 and 8.

TABLE 1

|  | Example 1 | | | | Example 2 | | | |
| --- | --- | --- | --- | --- | --- | --- | --- | --- |
| Plastic lens substrate | Diethylene glycol bisallyl carbonate | | | | Diethylene glycol bisallyl carbonate | | | |
| Hard coat layer | Layer A | | | | Layer A | | | |
| Ion Acceleration Voltage for Pretreatment | 150 V | | | | 150 V | | | |
| Current | 100 mA | | | | 100 mA | | | |
| Exposure time | 60 sec | | | | 60 sec | | | |
| Gas used | Ar | | | | Ar | | | |

|  | Type of film | Optical Film thickness | Setting values for ion gun | | Type of film | Optical Film thickness | Setting values for ion gun | |
| --- | --- | --- | --- | --- | --- | --- | --- | --- |
| Basic layer | Nb | 4.0 nm | 150 V | 100 mA | Nb | 4.0 nm | 150 V | 100 mA |
| 1st layer | $SiO_2$ | 31.5 nm | 450 V | 160 mA | $SiO_2$ | 22.0 nm | 450 V | 160 mA |
| 2nd layer | $TiO_2$ | 3.5 nm | 360 V | 105 mA | $TiO_2$ | 29.0 nm | 360 V | 105 mA |
| 3rd layer | $SiO_2$ | 235.0 nm | 450 V | 160 mA | $SiO_2$ | 48.5 nm | 450 V | 160 mA |
| 4th layer | $TiO_2$ | 23.5 nm | 360 V | 105 mA | $TiO_2$ | 98.0 nm | 360 V | 105 mA |
| 5th layer | $SiO_2$ | 42.5 nm | 450 V | 160 mA | $SiO_2$ | 23.5 nm | 450 V | 160 mA |
| 6th layer | $TiO_2$ | 251.5 nm | 360 V | 105 mA | $TiO_2$ | 88.0 nm | 360 V | 105 mA |
| 7th layer | $SiO_2$ | 118.0 nm | 450 V | 160 mA | $SiO_2$ | 130.0 nm | 450 V | 160 mA |

| Gas used for ion assistance | Ar gas for Nb and $SiO_2$ Mixture of $O_2$ and Ar (1:1) for $TiO_2$ | | | | Ar gas for Nb and $SiO_2$ Mixture of $O_2$ and Ar (1:1) for $TiO_2$ | | | |
| --- | --- | --- | --- | --- | --- | --- | --- | --- |
| Evaluation of performance of plastic lens | | | | | | | | |
| Luminous reflectance ($Y_R$), % | 0.82% | | | | 0.82% | | | |
| Luminous transmittance ($Y_T$), % | 99.0% | | | | 99.0% | | | |
| Film adhesiveness | 100/100 | | | | 100/100 | | | |
| Abrasion resistance | UA | | | | UA to A | | | |
| Heat resistance | 95° C. | | | | 100° C. | | | |
| Alkali resistance | UA | | | | UA to A | | | |
| Impact resistance | O | | | | O | | | |

TABLE 2

|  | Example 3 | Example 4 |
| --- | --- | --- |
| Plastic lens substrate | Diethylene glycol bisallyl carbonate | Diethylene glycol bisallyl carbonate |
| Hard coat layer | Layer A | Layer A |
| Ion Acceleration Voltage for Pretreatment | 150 V | 150 V |
| Current | 100 mA | 100 mA |
| Exposure time | 60 sec | 40 sec |
| Gas used | Ar | Ar |

TABLE 2-continued

|  | Type of film | Optical Film thickness | Setting values for ion gun | Type of film | Optical Film thickness | Setting values for ion gun |
|---|---|---|---|---|---|---|
| Basic layer | Nb | 3.5 nm | 150 V 100 mA | Nb | 4.0 nm | 150 V 100 mA |
| 1st layer | $SiO_2$ | 94.0 nm | 450 V 160 mA | $SiO_2$ | 108.0 nm | 450 V 160 mA |
| 2nd layer | Nb | 3.5 nm | 360 V 105 mA | $TiO_2$ | 52.5 nm | 360 V 105 mA |
| 3rd layer | $SiO_2$ | 94.0 nm | 150 V 100 mA | $SiO_2$ | 271.8 nm | 450 V 160 mA |
| 4th layer | $TiO_2$ | 225.5 nm | 360 V 105 mA | $TiO_2$ | 38.6 nm | 360 V 105 mA |
| 5th layer | $SiO_2$ | 42.6 nm | 450 V 160 mA | $SiO_2$ | 38.6 nm | 450 V 160 mA |
| 6th layer | $TiO_2$ | 249.0 nm | 360 V 105 mA | $TiO_2$ | 242.8 nm | 360 V 105 mA |
| 7th layer | $SiO_2$ | 117.0 nm | 450 V 160 mA | $SiO_2$ | 119.0 nm | 450 V 160 mA |
| Gas used for ion assistance | | Ar gas for Nb and $SiO_2$ Mixture of $O_2$ and Ar (1:1) for $TiO_2$ Evaluation of performance of plastic lens | | | Ar gas for Nb and $SiO_2$ Mixture of $O_2$ and Ar (1:1) for $TiO_2$ | |
| Luminous reflectance ($Y_R$), % | | 0.82% | | | 0.68% | |
| Luminous transmittance ($Y_T$), % | | 99.0% | | | 99.3% | |
| Film adhesiveness | | 100/100 | | | 100/100 | |
| Abrasion resistance | | UA | | | UA to A | |
| Heat resistance | | 95° C. | | | 100° C. | |
| Alkali resistance | | UA | | | UA | |
| Impact resistance | | O | | | O | |

TABLE 3

|  | Example 5 | Example 6 |
|---|---|---|
| Plastic lens substrate | Diethylene glycol bisallyl carbonate | Diethylene glycol bisallyl carbonate |
| Hard coat layer | Layer A | Layer A |
| Ion Acceleration Voltage for Pretreatment | 150 V | 150 V |
| Current | 100 mA | 100 mA |
| Exposure time | 40 sec | 40 sec |
| Gas used | Ar | Ar |

|  | Type of film | Optical Film thickness | Setting values for ion gun | Type of film | Optical Film thickness | Setting values for ion gun |
|---|---|---|---|---|---|---|
| Basic layer | Nb | 4.0 nm | 150 V 100 mA | Nb | 3.5 nm | 150 V 100 mA |
| 1st layer | $SiO_2$ | 7.9 nm | 450 V 160 mA | $SiO_2$ | 111.9 nm | 450 V 160 mA |
| 2nd layer | $TiO_2$ | 28.4 nm | 360 V 105 mA | Nb | 3.5 nm | 150 V 100 mA |
| 3rd layer | $SiO_2$ | 49.0 nm | 450 V 160 mA | $SiO_2$ | 111.9 nm | 450 V 160 mA |
| 4th layer | $TiO_2$ | 116.5 nm | 360 V 105 mA | $TiO_2$ | 25.2 nm | 360 V 105 mA |
| 5th layer | $SiO_2$ | 10.9 nm | 450 V 160 mA | $SiO_2$ | 41.2 nm | 450 V 160 mA |
| 6th layer | $TiO_2$ | 110.8 nm | 360 V 105 mA | $TiO_2$ | 245.0 nm | 360 V 105 mA |
| 7th layer | $SiO_2$ | 125.5 nm | 450 V 160 mA | $SiO_2$ | 119.3 nm | 450 V 160 mA |
| Gas used for ion assistance | | Ar gas for Nb and $SiO_2$ Mixture of $O_2$ and Ar (1:1) for $TiO_2$ Evaluation of performance of plastic lens | | | Ar gas for Nb and $SiO_2$ Mixture of $O_2$ and Ar (1:1) for $TiO_2$ | |
| Luminous reflectance ($Y_R$), % | | 0.68% | | | 0.68% | |
| Luminous transmittance ($Y_T$), % | | 99.3% | | | 99.3% | |
| Film adhesiveness | | 100/100 | | | 100/100 | |
| Abrasion resistance | | UA to A | | | UA | |
| Heat resistance | | 100° C. | | | 95° C. | |
| Alkali resistance | | UA to A | | | UA | |
| Impact resistance | | O | | | O | |

TABLE 4

|  | Example 7 | Example 8 |
|---|---|---|
| Plastic lens substrate | Diethylene glycol bisallyl carbonate | Diethylene glycol bisallyl carbonate |
| Hard coat layer | Layer A | Layer A |
| Ion Acceleration Voltage for Pretreatment | 150 V | 150 V |
| Current | 100 mA | 100 mA |
| Exposure time | 60 sec | 60 sec |
| Gas used | Ar | Ar |

|  | Type of film | Optical Film thickness | Setting values for ion gun | Type of film | Optical Film thickness | Setting values for ion gun |
|---|---|---|---|---|---|---|

TABLE 4-continued

| | | | | | | | | |
|---|---|---|---|---|---|---|---|---|
| Basic layer | Nb | 4.0 nm | 150 V | 100 mA | Nb | 4.0 nm | 150 V | 100 mA |
| 1st layer | SiO$_2$ | 14.6 nm | 450 V | 160 mA | SiO$_2$ | 10.5 nm | 450 V | 160 mA |
| 2nd layer | Ta$_2$O$_5$ | 9.5 nm | 420 V | 120 mA | Ta$_2$O$_5$ | 26.0 nm | 420 V | 120 mA |
| 3rd layer | SiO$_2$ | 292.0 nm | 450 V | 160 mA | SiO$_2$ | 54.2 nm | 450 V | 160 mA |
| 4th layer | Ta$_2$O$_5$ | 66.8 nm | 420 V | 120 mA | Ta$_2$O$_5$ | 94.0 nm | 420 V | 120 mA |
| 5th layer | SiO$_2$ | 29.7 nm | 450 V | 160 mA | SiO$_2$ | 24.2 nm | 450 V | 160 mA |
| 6th layer | Ta$_2$O$_5$ | 124.9 nm | 420 V | 120 mA | Ta$_2$O$_5$ | 91.0 nm | 420 V | 120 mA |
| 7th layer | SiO$_2$ | 131.2 nm | 450 V | 160 mA | SiO$_2$ | 134.1 nm | 450 V | 160 mA |

| | |
|---|---|
| Gas used for ion assistance | Ar gas for Nb and SiO$_2$ / Mixture of O$_2$ and Ar (1:0.25) for Ta$_2$O$_5$ — Ar gas for Nb and SiO$_2$ / Mixture of O$_2$ and Ar (1:0.25) for Ta$_2$O$_5$ |

Evaluation of performance of plastic lens

| | | |
|---|---|---|
| Luminous reflectance (Y$_R$), % | 0.80% | 0.80% |
| Luminous transmittance (Y$_T$), % | 99.1% | 99.1% |
| Film adhesiveness | 100/100 | 100/100 |
| Abrasion resistance | UA | UA |
| Heat resistance | 95° C. | 95° C. |
| Alkali resistance | UA | UA |
| Impact resistance | O | O |

TABLE 5

| | Example 9 | Example 10 |
|---|---|---|
| Plastic lens substrate | Diethylene glycol bisallyl carbonate | Diethylene glycol bisallyl carbonate |
| Hard coat layer | Layer A | Layer A |
| Ion Acceleration Voltage for Pretreatment | 150 V | 150 V |
| Current | 100 mA | 100 mA |
| Exposure time | 60 sec | 60 sec |
| Gas used | Ar | Ar |

| | Type of film | Optical Film thickness | Setting values for ion gun | | Type of film | Optical Film thickness | Setting values for ion gun | |
|---|---|---|---|---|---|---|---|---|
| Basic layer | Nb | 4.0 nm | 150 V | 100 mA | Nb | 4.0 nm | 150 V | 100 mA |
| 1st layer | SiO$_2$ | 33.5 nm | 450 V | 160 mA | SiO$_2$ | 10.5 nm | 450 V | 160 mA |
| 2nd layer | Nb$_2$O$_5$ | 4.5 nm | 360 V | 105 mA | Nb$_2$O$_5$ | 26.4 nm | 360 V | 105 mA |
| 3rd layer | SiO$_2$ | 292.0 nm | 450 V | 160 mA | SiO$_2$ | 54.2 nm | 450 V | 160 mA |
| 4th layer | Nb$_2$O$_5$ | 23.9 nm | 360 V | 105 mA | Nb$_2$O$_5$ | 94.0 nm | 360 V | 105 mA |
| 5th layer | SiO$_2$ | 46.2 nm | 450 V | 160 mA | SiO$_2$ | 24.2 nm | 450 V | 160 mA |
| 6th layer | Nb$_2$O$_5$ | 243.8 nm | 360 V | 105 mA | Nb$_2$O$_5$ | 91.0 nm | 360 V | 105 mA |
| 7th layer | SiO$_2$ | 121.2 nm | 450 V | 160 mA | SiO$_2$ | 134.1 nm | 450 V | 160 mA |

| | | |
|---|---|---|
| Gas used for ion assistance | Ar gas for Nb and SiO$_2$ / Mixture of O$_2$ and Ar (1:0.11) for Nb$_2$O$_5$ | Ar gas for Nb and SiO$_2$ / Mixture of O$_2$ and Ar (1:0.11) for Nb$_2$O$_5$ |

Evaluation of performance of plastic lens

| | | |
|---|---|---|
| Luminous reflectance (Y$_R$), % | 0.68% | 0.68% |
| Luminous transmittance (Y$_T$), % | 99.3% | 99.3% |
| Film adhesiveness | 100/100 | 100/100 |
| Abrasion resistance | UA | UA to A |
| Heat resistance | 95° C. | 100° C. |
| Alkali resistance | UA | UA to A |
| Impact resistance | O | O |

TABLE 6

| | Example 11 | Example 12 |
|---|---|---|
| Plastic lens substrate | Diethylene glycol bisallyl carbonate | Diethylene glycol bisallyl carbonate |
| Hard coat layer | Layer A | Layer A |
| Ion Acceleration Voltage for Pretreatment | 150 V | 150 V |
| Current | 100 mA | 100 mA |
| Exposure time | 40 sec | 40 sec |
| Gas used | Ar | Ar |

| | Type of film | Optical Film thickness | Setting values for ion gun | | Type of film | Optical Film thickness | Setting values for ion gun | |
|---|---|---|---|---|---|---|---|---|
| Basic layer | Nb | 3.5 nm | 150 V | 100 mA | Nb | 4.0 nm | 150 V | 100 mA |
| 1st layer | SiO$_2$ | 111.6 nm | 450 V | 160 mA | SiO$_2$ | 10.5 nm | 450 V | 160 mA |
| 2nd layer | Nb | 3.5 nm | 150 V | 100 mA | Nb$_2$O$_5$ | 26.4 nm | 360 V | 105 mA |
| 3rd layer | SiO$_2$ | 111.6 nm | 450 V | 160 mA | SiO$_2$ | 54.2 nm | 450 V | 160 mA |

TABLE 6-continued

| | | | | | | | | |
|---|---|---|---|---|---|---|---|---|
| 4th layer | Nb$_2$O$_5$ | 24.9 nm | 360 V | 105 mA | Nb$_2$O$_5$ | 94.0 nm | 360 V | 105 mA |
| 5th layer | SiO$_2$ | 39.5 nm | 450 V | 160 mA | SiO$_2$ | 24.2 nm | 450 V | 160 mA |
| 6th layer | Nb$_2$O$_5$ | 236.3 nm | 360 V | 105 mA | Nb$_2$O$_5$ | 91.0 nm | 360 V | 105 mA |
| 7th layer | SiO$_2$ | 120.2 nm | 450 V | 160 mA | SiO$_2$ | 134.5 nm | 450 V | 160 mA |

| | | |
|---|---|---|
| Gas used for ion assistance | Ar gas for Nb and SiO$_2$ Mixture of O$_2$ and Ar (1:0.11) for Nb$_2$O$_5$ | Ar gas for Nb and SiO$_2$ Mixture of O$_2$ and Ar (1:0.11) for Nb$_2$O$_5$ |

Evaluation of performance of plastic lens

| | | |
|---|---|---|
| Luminous reflectance (Y$_R$), % | 0.68% | 0.68% |
| Luminous transmittance (Y$_T$), % | 99.3% | 99.3% |
| Film adhesiveness | 100/100 | 100/100 |
| Abrasion resistance | UA | UA to A |
| Heat resistance | 95° C. | 100° C. |
| Alkali resistance | UA | UA to A |
| Impact resistance | O | O |

TABLE 7

| | Comparative Example 1 | Comparative Example 2 |
|---|---|---|
| Plastic lens substrate | Diethylene glycol bisallyl carbonate | Diethylene glycol bisallyl carbonate |
| Hard coat layer | Layer A | Layer A |
| Ion Acceleration Voltage for Pretreatment | no pretreatment | no pretreatment |
| Current | | |
| Exposure time | | |
| Gas used | | |

| | Type of film | Optical Film thickness | Setting values for ion gun | | Type of film | Optical Film thickness | Setting values for ion gun | |
|---|---|---|---|---|---|---|---|---|
| Basic layer | — | — | — | — | — | — | — | — |
| 1st layer | SiO$_2$ | 31.5 nm | — | — | SiO$_2$ | 22.0 nm | — | — |
| 2nd layer | TiO$_2$ | 3.5 nm | — | — | TiO$_2$ | 29.0 nm | — | — |
| 3rd layer | SiO$_2$ | 238.0 nm | — | — | SiO$_2$ | 48.5 nm | — | — |
| 4th layer | TiO$_2$ | 23.5 nm | — | — | TiO$_2$ | 98.0 nm | — | — |
| 5th layer | SiO$_2$ | 425.0 nm | — | — | SiO$_2$ | 23.5 nm | — | — |
| 6th layer | TiO$_2$ | 251.5 nm | — | — | TiO$_2$ | 88.0 nm | — | — |
| 7th layer | SiO$_2$ | 118.0 nm | — | — | SiO$_2$ | 130.0 nm | — | — |

Evaluation of performance of plastic lens

| | | |
|---|---|---|
| Luminous reflectance (Y$_R$), % | 1.1% | 1.1% |
| Luminous transmittance (Y$_T$), % | 98.7% | 98.7% |
| Film adhesiveness | 95/100 | 95/100 |
| Abrasion resistance | B | B to C |
| Heat resistance | 70° C. | 70° C. |
| Alkali resistance | B | B to C |
| Impact resistance | x | O |

TABLE 8

| | Comparative Example 3 | Comparative Example 4 |
|---|---|---|
| Plastic lens substrate | Diethylene glycol bisallyl carbonate | Diethylene glycol bisallyl carbonate |
| Hard coat layer | Layer A | Layer A |
| Ion Acceleration Voltage for Pretreatment | no pretreatment | no pretreatment |
| Current | | |
| Exposure time | | |
| Gas used | | |

| | Type of film | Optical Film thickness | Setting values for ion gun | | Type of film | Optical Film thickness | Setting values for ion gun | |
|---|---|---|---|---|---|---|---|---|
| Basic layer | — | — | — | — | — | — | — | — |
| 1st layer | SiO$_2$ | 14.6 nm | — | — | SiO$_2$ | 10.5 nm | — | — |
| 2nd layer | Ta$_2$O$_5$ | 9.5 nm | — | — | Ta$_2$O$_5$ | 26.4 nm | — | — |
| 3rd layer | SiO$_2$ | 292.0 nm | — | — | SiO$_2$ | 54.2 nm | — | — |
| 4th layer | Ta$_2$O$_5$ | 66.8 nm | — | — | Ta$_2$O$_5$ | 94.0 nm | — | — |
| 5th layer | SiO$_2$ | 29.7 nm | — | — | SiO$_2$ | 24.2 nm | — | — |

TABLE 8-continued

| 6th layer | Ta$_2$O$_5$ | 124.9 nm | — | — | Ta$_2$O$_5$ | 91.0 nm | — | — |
| 7th layer | SiO$_2$ | 131.2 nm | — | — | SiO$_2$ | 134.1 nm | — | — |
| Evaluation of performance of plastic lens | | | | | | | | |
| Luminous reflectance (Y$_R$), % | 1.2% | | | | 1.2% | | | |
| Luminous transmittance (Y$_T$), % | 98.6% | | | | 98.6% | | | |
| Film adhesiveness | 95/100 | | | | 95/100 | | | |
| Abrasion resistance | B | | | | B to C | | | |
| Heat resistance | 70° C. | | | | 75° C. | | | |
| Alkali resistance | B | | | | B | | | |
| Impact resistance | x | | | | x | | | |

As shown in Tables 1 to 6, the plastic lenses of Examples 1 to 12 had an extremely small luminous reflectance of from 0.68 to 0.82% and had a high luminance transmittance of from 99.0 to 99.3%. In addition, their film adhesiveness, abrasion resistance, heat resistance, alkali resistance and impact resistance were good.

In contrast, the plastic lenses of Comparative Examples 1 to 4 had a high luminous reflectance of from 1.1 to 1.2% and had a low luminance transmittance of from 98.6 to 98.7%, as shown in Tables 7 and 8. In addition, their film adhesiveness, abrasion resistance, heat resistance, alkali resistance and impact resistance were inferior to those in Examples 1 to 12.

As described in detail hereinabove, the optical element of the invention has an antireflection film, in which the reflectance is small, and the transmittance is high, and, in addition, it has excellent adhesiveness between the plastic substrate and the antireflection film, abrasion resistance, heat resistance, alkali resistance and impact resistance.

What is claimed is:

1. An optical element comprising
   a plastic substrate,
   a cured film on the plastic substrate,
   a basic layer comprising niobium(Nb) on the surface of the cured film, wherein the basic layer has a thickness of 1–5 nm,
   and an antireflection film on the surface of the basic layer wherein the optical element has a luminous transmittance of at least 99%.

2. An optical element according to claim 1 wherein the basic layer consists of niobium.

3. An optical element according to claim 1 wherein the antireflective film comprises a low-refractive layer and a high-refractive layer.

4. An optical element according to claim 3 wherein the low-refractive layer comprises SiO$_2$.

5. An optical element according to claim 3 wherein the high-refractive layer comprises TiO$_2$.

6. An optical element according to claim 1 wherein the cured film is made from a mixture of metal oxide colloid particles and at least one organosilicon compound of the formula (1):

$$(R^1)_a(R^2)_b Si(OR^3)_{4-(a+b)} \quad (1)$$

wherein $R^1$ and $R^2$ each independently represents an organic group selected from an C$_{1-8}$ alkyl group, an C$_{2-8}$ alkenyl group, an aryl group, a phenyl group, a 5- or 6-membered heteroaryl group having at least one heteroatom selected from sulfur and nitrogen which may optionally be substituted by one or more C$_{1-3}$ alkyl group(s), an C$_{1-8}$ acyl group, a halogen atom, a glycidoxy group, an epoxy group, an amino group, a phenyl group, a mercapto group, a methacryloxy group, and a cyano group; $R^3$ represents an organic group selected from an alkyl group having from 1 to 8 carbon atoms, an C$_{1-8}$ acyl group, and a phenyl group; and a and b each independently indicates an integer of 0 or 1.

7. An optical element according to claim 1 wherein the antireflection film is one having the following layers successively from the plastic substrate side:
   SiO$_2$ layer,
   TiO$_2$ layer,
   SiO$_2$ layer,
   TiO$_2$ layer
   SiO$_2$ layer,
   TiO$_2$ layer, and
   SiO$_2$ layer.

8. An optical element according to claim 1 having an antireflection film having the following layers successively from the plastic substrate side:
   SiO$_2$ layer,
   Nb layer,
   SiO$_2$ layer,
   TiO$_2$ layer,
   SiO$_2$ layer,
   TiO$_2$ layer, and
   SiO$_2$ layer.

9. An optical element according to any one of claims 1–3 and 6–8, wherein at least one of the antireflection film or basic layer is obtainable by an ion-assisted process.

10. An optical element according to any one of claims 1–3 and 6–8 wherein each of the antireflection film and basic layer is formed by an ion-assisted process.

11. An optical element according to any one of claims 1–3 and 6–8 wherein the cured film is on the surface of the plastic substrate.

12. An optical element according to any one of claims 1–8 having a luminous transmittance of between 99.0 and 99.3%.

* * * * *